US 6,543,800 B1

(12) United States Patent
Doran

(10) Patent No.: US 6,543,800 B1
(45) Date of Patent: Apr. 8, 2003

(54) TRANSPORTATION APPARATUS FOR TRANSPORTING PERSONAL ITEMS

(76) Inventor: Gerard M. Doran, 117 Edison Ave., Collingswood, NJ (US) 08108

( * ) Notice: Subject to any disclaimer, the term of this patent is extended or adjusted under 35 U.S.C. 154(b) by 0 days.

(21) Appl. No.: 10/020,795

(22) Filed: Dec. 11, 2001

Related U.S. Application Data

(60) Provisional application No. 60/254,265, filed on Dec. 11, 2000.

(51) Int. Cl.[7] .................................................. B62B 1/04
(52) U.S. Cl. .................. 280/652; 280/47.18; 280/47.26
(58) Field of Search ........................... 280/639, 37, 40, 280/42, 651, 653, 659, 47.131, 47.17, 47.18, 47.19, 47.26, 47.31, 47.34, 47.35, DIG. 3, 652; 5/626, 627

(56) References Cited

U.S. PATENT DOCUMENTS

| 1,276,322 | A | * | 8/1918 | Bullock ........................ 248/98 |
| 1,554,034 | A | * | 9/1925 | Richie ......................... 16/436 |
| 2,459,865 | A | * | 1/1949 | Bourne ........................ 280/14 |
| 3,140,878 | A | * | 7/1964 | Davis ........................... 280/18 |
| 3,927,894 | A | | 12/1975 | Zawislak |
| 5,215,318 | A | | 6/1993 | Capraro |
| 5,222,748 | A | | 6/1993 | Johnson |
| 5,246,401 | A | * | 9/1993 | Boatwright ................... 280/18 |
| 5,620,191 | A | | 4/1997 | Sayette |
| 6,039,243 | A | * | 3/2000 | Lickton ....................... 206/335 |
| 6,142,491 | A | * | 11/2000 | Darling, III ................. 224/627 |
| 6,164,671 | A | * | 12/2000 | Darling, III ................. 280/204 |
| 6,375,200 | B1 | * | 4/2002 | Harter ......................... 280/30 |

* cited by examiner

Primary Examiner—Brian L. Johnson
Assistant Examiner—Bridget Avery
(74) Attorney, Agent, or Firm—Matthew J. Peirce

(57) ABSTRACT

A new and improved apparatus for transporting beach items over the asphalt and through the sand in an easy and efficient manner is disclosed. The apparatus comprises a pliable base capable of being rolled up, with the base having an axle and a pair of wheels to allow easy mobility. The base has mesh netting fixedly attached to the top surface of the base around the perimeter of the base which is topped off by a rim, with the rim being attached to a front-mounted drawstring. Once the base is properly unfolded, the mesh netting can be held open and the base loaded with while being held in place by both the netting and a quartet of adjustable straps. The present invention also includes a pair of ropes that are each attached to the front end of the base. The ropes would each be used on differing surface types on which a user would want to pull the present invention across. When not in use, the mesh netting simply would lie on the base and the pliable base would merely be folded up.

5 Claims, 1 Drawing Sheet

TRANSPORTATION APPARATUS FOR TRANSPORTING PERSONAL ITEMS

BACKGROUND OF THE INVENTION

This Appl. claims benefit of Provisional No. 60/254,265 filed Dec. 11, 2000.

The present invention concerns that of a new and improved apparatus for transporting beach items over asphalt and through the sand in an easy and efficient manner.

DESCRIPTION OF THE PRIOR ART

U.S. Pat. No. 5,620,191, issued to Sayette, discloses a sled for moving a plurality of objects, such as beach equipment, over varied terrain having soft and hard surfaces such as sand, mud, snow, concrete, brick, cobblestone and asphalt.

U.S. Pat. No. 5,222,748, issued to Johnson, discloses a wheeled beach sled kit of separate parts adapted for intermittent assemblage and disasemblage thereof into a sled.

U.S. Pat. No. 5,215,318, issued to Capraro, discloses a body trailer which consists of a housing having a compartment for storing various items, with a door hinged to the housing for covering the compartment.

U.S. Pat. No. 3,927,894, issued to Zawislak, discloses a sled that may be used for the transportation of packages on sand or on snow that may also be rolled over solid ground.

SUMMARY OF THE INVENTION

The present invention concerns that of a new and improved apparatus for transporting beach items over the asphalt and through the sand in an easy and efficient manner. The apparatus comprises a pliable base capable of being rolled up, with the base having an axle and a pair of wheels to allow easy mobility. The base has mesh netting fixedly attached to the top surface of the base around the perimeter of the base which is topped off by a rim, with the rim being attached to a front-mounted drawstring. Once the base is properly unfolded, the mesh netting can be held open and the base loaded with while being held in place by both the netting and a quartet of adjustable straps. The present invention also includes a pair of ropes that are each attached to the front end of the base. The ropes would each be used on differing surface types on which a user would want to pull the present invention across. When not in use, the mesh netting simply would lie on the base and the pliable base would merely be folded up.

There has thus been outlined, rather broadly, the more important features of a transportation device for transporting personal items over various land surfaces at a beach in order that the detailed description thereof that follows may be better understood and in order that the present contribution to the art may be better appreciated. There are, of course, additional features of the transportation device that will be described hereinafter and which will form the subject matter of the claims appended hereto.

In this respect, before explaining at least one embodiment of the transportation device in detail, it is to be understood that the transportation device is not limited in its application to the details of construction and to the arrangements of the components set forth in the following description or illustrated in the drawings. The transportation device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present transportation device. It is important, therefore, that the claims be regard as including such equivalent constructions insofar as -they do not depart from the spirit and scope of the present invention.

It is therefore an object of the present invention to provide a transportation device which has all of the advantages of the prior art and none of the disadvantages.

It is another object of the present invention to provide a transportation device which may be easily and efficiently manufactured and marketed.

It is another object of the present invention to provide a transportation device which is of durable and reliable construction.

It is yet another object of the present invention to provide a transportation device which is economically affordable and available for the buying public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
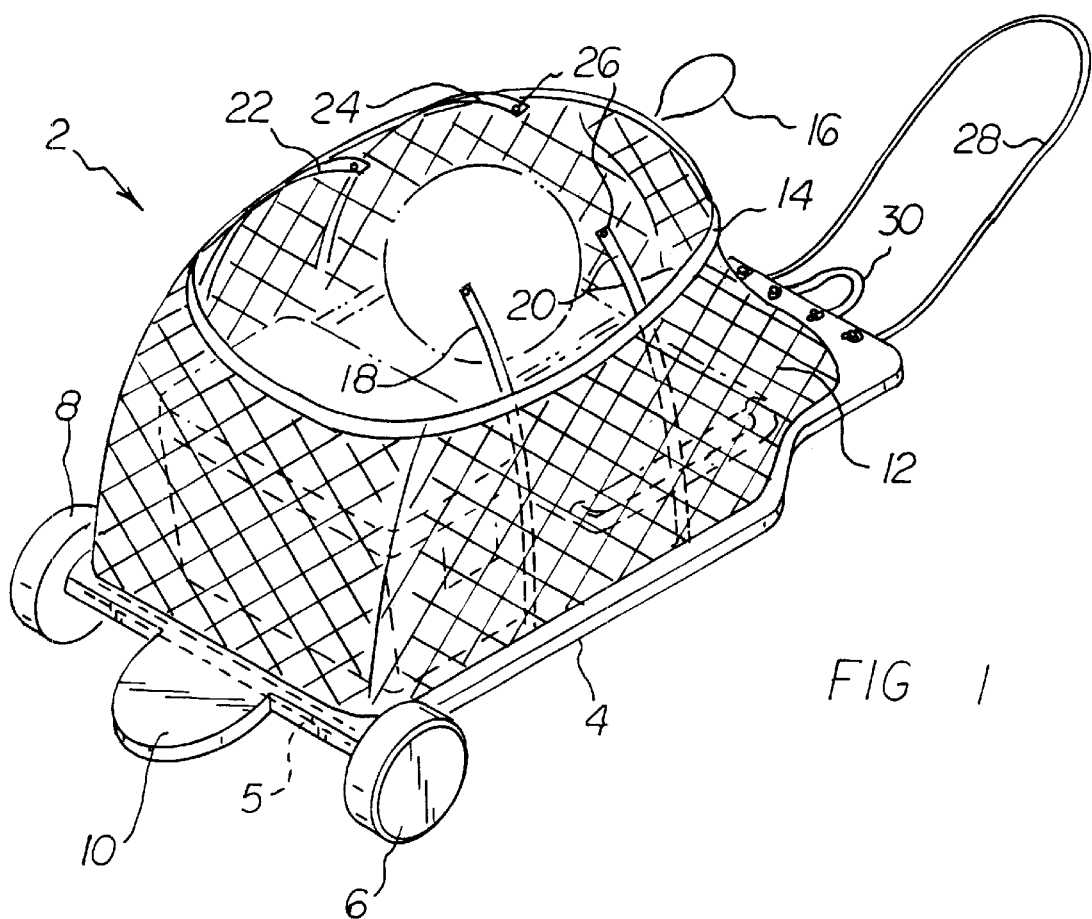
FIG. 1 shows a perspective view of the present invention.

FIG. 1 shows a perspective view of the present invention. The present invention concerns that of a new and improved apparatus 2 for transporting beach items over asphalt and through sand in an easy and efficient manner. The apparatus 2 comprises a pliable base 4 capable of being rolled up, with the base 4 being fabricated in the shape of a rectangle and being approximately four to five feet long and approximately eighteen inches wide. The base has two ends, a first end and a second end, and also has two surfaces, a top surface and a bottom surface. The base has an axle 5 located near the second end of the base. The base has a pair of wheels, a first wheel 6 and a second wheel 8, with the wheels being attached to the axle 5 and the wheels being located at the corners located at the second end. The base also includes a beaver tail 10, which is extra base material that is fixedly attached to the bottom surface of the base near the second end of the base approximately halfway between the first wheel 6 and the second wheel 8. A user would step on the beaver tail 10 to keep the present invention unrolled while loading the present invention.

The present invention also includes mesh netting 12, which is fixedly attached to the top surface of the base 4 around the perimeter of the base 4 except for a small area about three inches from the first end of the base 4. The small area is used for the attachment of the ropes used with the present invention. The mesh netting 12 is topped off by a rim 14, with the rim 14 being attached to a front-mounted drawstring 16. Once the base 4 is properly unfolded, the mesh netting 12 can be held open and the base loaded with while being held in place by both the netting and adjustable straps 18, 20, 22, and 24. Each adjustable strap has two ends, a first end and a second end. The first end of each adjustable strap is pivotally attached to the top surface of the base 4 of the present invention. The second end of each adjustable strap has attachment means 26 to attach to the adjustable strap located opposite it on the other side of the base 4. Each adjustable strap can be extended or retracted to various lengths to accommodate the load being carried by the base 4.

The present invention also includes a large hold rope 28 and a small hold rope 30, which are both fixedly attached to the first end of the base 4. The large hold rope 28 has two ends, a first end and a second end, with the first end and the second end of the large hold rope 28 each being attached to the base 4 near the corners of the first end of the base 4. The small hold rope 30 has two ends, a first end and a second end, with the first end and the second end of the small hold rope 30 each being attached to the base 4 more centrally located than the attachment of the first end and the second end of the large hold rope 28.

The large hold rope 28 would be ideal for a user to pull the present invention over sand when the present invention would be full. The small hold rope 30 would be ideal for a user to pull the present invention over asphalt or another hard surface when the present invention would be full.

When not in use, the mesh netting 12 simply would lie on the base 4 so the apparatus 2 could be rolled up for easy storage. Apparatus 2 could be rolled up from either end and the mesh netting 12 need not be folded or attached for apparatus 2 to be rolled up. When apparatus 2 is empty, mesh netting 12 would simply lie on the top of base 4 and apparatus 2 could be easily rolled up. The present invention could then be easily transported for later use.

Figure 2:
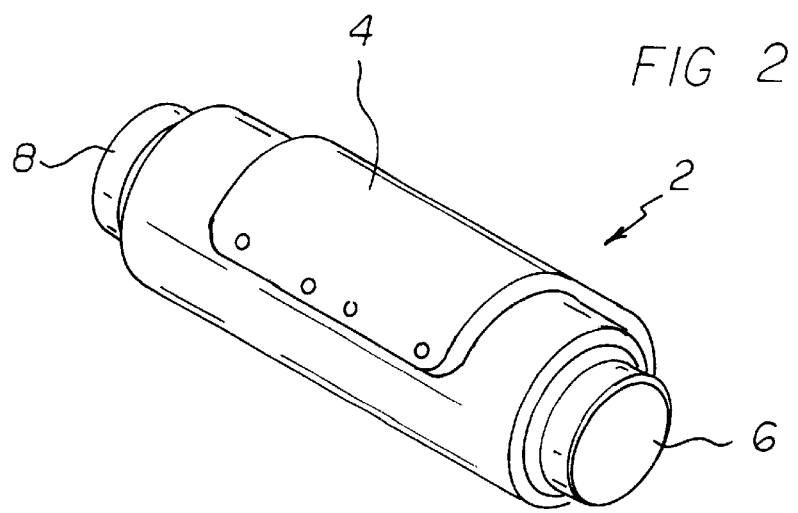
FIG. 2 shows a perspective view of the present invention after it has been rolled up.

FIG. 2 shows a perspective view of the present invention after it has been rolled up.

What I claim as my invention is:

1. An apparatus for transporting items over various land surfaces comprising:

(a) a base having two ends, a first end and a second end, the base also having two surfaces, a top surface and a bottom surface, the base having a length of approximately four to five feet, the base having a width of approximately eighteen inches, the base being fabricated from a pliable material, (b) an axle attached to the base, the axle being located near the second end of the base, the axle having two ends, a first end and a second end, (c) a pair of wheels comprising a first wheel and a second wheel, the first wheel being attached to the first end of the axle, the second wheel being attached to the second end of the axle, (d) a piece of extra base material fixedly attached to the second end of the base approximately halfway between the first end of the axle and the second end of the axle, the piece of extra base material preferably having a shape similar to a semicircle, (e) a continuous surface of mesh netting, the mesh netting being attached to the top surface of the base around the perimeter of the base except for a small area about three inches from the first end of the base, the mesh netting having a circular open top, (f) a rim attached to the perimeter of the circular open top of the mesh netting, (g) a drawstring located within the rim, the drawstring also extending out from a small portion of the rim facing the first end of the base, the small portion of the rim extending outward being used to tighten and loosen the drawstring within the rim, (h) a plurality of adjustable straps each having two ends, a first end and a second end, the first end of each adjustable strap being pivotally attached to a portion of the top surface of the base within the mesh netting, the second end of each adjustable strap having attachment means for securing the adjustable strap to a specific part of the apparatus, (i) means for pulling the apparatus over a flat surface comprising sand, (j) means for pulling the apparatus over a hard and flat surface, (k) wherein the apparatus could be rolled up by placing the mesh netting on the top surface of the base and rolling up the base.

2. An apparatus for transporting items over various land surfaces according to claim 1 wherein the means for pulling the apparatus over a flat surface comprising sand further comprises:

(a) a large hold rope having two ends, a first end and a second end, the first end and the second end of the large hold rope being attached to the base near the corners of the first end of the base, (b) wherein a user pulls the large hold rope over a surface comprising sand to properly be able to move the apparatus as desired.

3. An apparatus for transporting items over various land surfaces according to claim 1 wherein the means for rolling the apparatus over a hard and flat surface further comprises:

(a) a small hold rope having two ends, a first end and a second end, the first end and the second end of the small hold rope being attached to the base fairly close to the center point between the corners on the first end of the base, (b) wherein a user pulls the small hole rope over a hard and flat surface to properly be able to move the apparatus as desired.

4. An apparatus for transporting items over various land surfaces according to claim 1 wherein the plurality of adjustable straps amounts to four.

5. An apparatus for transporting items over various land surfaces according to claim 1 wherein the specific part of the apparatus that the second end of each adjustable strap is attached to is the second end of another adjustable strap.

* * * * *